UNITED STATES PATENT OFFICE.

ERNST WILLY FRIEDRICH, OF BLATON, BELGIUM.

CELLULOSE SOLUTION.

No. 813,878.     Specification of Letters Patent.     Patented Feb. 27, 1906.

Application filed August 22, 1905. Serial No. 275,228.

*To all whom it may concern:*

Be it known that I, ERNST WILLY FRIEDRICH, a subject of the German Emperor, and a resident of Blaton, in the Kingdom of Belgium, have invented new and useful Improvements in Cellulose Solutions, of which the following is a full, clear, and exact specification.

The object of my invention is a process for the production of cellulose solutions, in which process solutions of cupric oxid alkylamin are employed in the place of the hitherto-used solutions of cupric oxid ammonia.

The use of my solvent has the advantage that more concentrated solutions of cellulose are obtained than by aid of cupric oxid ammonia. Moreover, less alkylamin is necessary than ammonia for this better effect. Further, my solutions are more viscous and keep unchanged at ordinary temperature.

My solution can be used in the manufacture of artificial threads or can be used in the manufacture of films, as agglutinants, for impregnation, for the production of celluloid-like substances, leather imitations, linoleum imitations, &c.

The use of my solutions in the manufacture of threads has important advantages compared with the use of other solutions. The coagulation is done very quickly and the resulting thread is so resilient that broken threads are almost entirely avoided. The thread, therefore, can be wound up with a high speed, and it can be made, in consequence, in most of the spinning-machines. Further, the threads can be washed very easily, owing to the high solubility of the resulting alkylamin salts. The spinning mass can be mixed with any of the known substances, rendering the threads either soft or stiff. After being washed the threads show all physical qualities of silk.

My process is carried out by dissolving cellulose of any origin in a solution of cupric oxid alkylamin, either directly or after having disintegrated the cellulose by any known process, (mercerization, hydration, oxidation.) I have found it even more practical to combine the production of cupric oxid alkylamin with the solution of the cellulose, this solution being accelerated.

Example: Three hundred and twenty (320) grams of well-cleaned cellulose are moistened with hot water, fairly pressed, and then in a wet condition put into three thousand four hundred (3,400) cubic centimeters of a solution of caustic soda of thirty (30°) degrees Baumé. The mercerization being finished, two hundred and fifty (250) grams of pulverized copper sulfate are slowly added. Now I separate by filtration the water containing dissolved sodium sulfate. Then I press, triturate the wet mass, and add thereupon a thirty (30) per cent. solution of monomethylamin in water, any elevation of temperature being avoided. The mass will instantaneously gelatinize and afterward be completely dissolved.

In the place of monomethylamin also other alkylamins which produce soluble compounds with cupric oxid may be used.

My process at the same time offers the advantage of utilizing with profit the alkylamins resulting as by-products, for instance, from the working up of molasses and which have been up to date nearly worthless.

What I claim is—

1. The process for the production of solutions of cellulose consisting in subjecting cellulose of any origin to the dissolving action of solutions of cupric oxid alkylamin, substantially as described.

2. The process for the production of solutions of cellulose consisting in subjecting disintegrated cellulose of any origin to the dissolving action of solutions of cupric oxid alkylamin, substantially as described.

3. The process for the production of solutions of cellulose consisting in moistening cellulose with hot water, pressing, treating with a solution of caustic soda, adding copper sulfate, filtering, triturating the residue and adding a solution of an alkylamin, substantially as described.

4. The process for the production of solutions of cellulose consisting in moistening cellulose with hot water, pressing, treating with a solution of caustic soda, adding copper sulfate, filtering, triturating the residue and adding a solution of monomethylamin, substantially as described.

5. As a new composition of matter solutions containing cellulose and cupric oxid alkylamin, substantially as described.

6. As a new composition of matter solutions containing cellulose and cupric oxid monomethylamin, substantially as described.

In testimony that I claim the foregoing as my invention I have signed my name in presence of two subscribing witnesses.

ERNST WILLY FRIEDRICH.

Witnesses:
GEO. W. ROOSEVELT.
GREGORY PHELAN.